(12) United States Patent
DuPuis

(10) Patent No.: US 7,434,474 B1
(45) Date of Patent: Oct. 14, 2008

(54) HERMETIC ATTACHMENT METHOD FOR PRESSURE SENSORS

(75) Inventor: Paul B. DuPuis, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/777,737

(22) Filed: Jul. 13, 2007

(51) Int. Cl.
*G01L 7/00* (2006.01)
(52) U.S. Cl. .......................................................... 73/756
(58) Field of Classification Search ..................... 73/756
See application file for complete search history.

(56) References Cited

U.S. PATENT DOCUMENTS

| | | | | |
|---|---|---|---|---|
| 4,509,880 | A | | 4/1985 | Wamstad |
| 5,515,732 | A | * | 5/1996 | Willcox et al. ................. 73/724 |
| 5,695,590 | A | * | 12/1997 | Willcox et al. ........... 156/272.2 |
| 6,091,022 | A | * | 7/2000 | Bodin ......................... 174/528 |
| 2002/0029639 | A1 | * | 3/2002 | Wagner et al. ................. 73/756 |
| 2007/0013014 | A1 | * | 1/2007 | Guo et al. ..................... 257/417 |

* cited by examiner

*Primary Examiner*—Andre J Allen
(74) *Attorney, Agent, or Firm*—Black Lowe & Graham, PLLC

(57) ABSTRACT

A pressure sensor includes a sensor die coupled to a glass support tube and located within a metallic intermediate sleeve. The glass support tube is bonded or otherwise attached to the metallic intermediate sleeve with solder or other adhesive material. End portions of the glass support tube and the metallic intermediate sleeve are configured to have complementary, contoured surfaces such that at least a portion of an attachment layer located there between is placed in compression during operation of the pressure sensor.

20 Claims, 3 Drawing Sheets

HERMETIC ATTACHMENT METHOD FOR PRESSURE SENSORS

BACKGROUND OF THE INVENTION

Many pressure sensors or transducers, such as micro-machined silicon pressure sensors, that require high reliability and stable performance for long periods of time are "absolute" pressure sensors that measure applied pressure relative to an integral reference vacuum reference chamber. Many are typically sealed within a hermetic hollow, outer body within which the reference vacuum resides. For example, a conventional high pressure silicon pressure sensor requires a hermetic attachment interface that connects an outer packaging element with an inner tube that supports the pressure sensing integrated circuit (IC) (i.e., pressure sensor "die"). Traditionally, the hermetic attachment interface includes solder or other adhesive material and takes the form of either a "butt" or a "sleeve" joint, as explained in greater detail below.

FIG. 1 shows a conventional absolute pressure sensor 100 having a sensor die 102 coupled to a glass support member 104. As illustrated, the glass support member 104 is adhered with an adhesive 106 to the package header 124. A package cover 108 includes a pressure inlet port 110. The sensor die 102 includes a sensor diaphragm 112 located between the pressure inlet port 110 and a vacuum reference chamber 114. In addition, the sensor die in this typical embodiment includes an active side 116 that faces away from the vacuum reference chamber 114. Electrical connections to and from the sensor die 102 are typically provided via bond wires 118 or an equivalent "lead frame" coupled to electrical interconnect pins 120. The pins 120 are positioned within insulated seals 122 that extend through a header portion 124 of the package cover 108. In this embodiment, the packaging material may be either metal or plastic since the only requirement for near-perfect hermeticity is for the seal between the sensor die 112 and the glass support member 104. That is required to maintain the integrity and hence stability of the reference vacuum. This configuration, however suffers mainly from the exposure of the active side (side with circuitry and interconnects on it) of the sensor IC die to atmospheric contaminants such as moisture, dust, and other fluidic and particulate contaminants, many of which are conductive to some extent. Such conductive contamination bridging between the electrical interconnects on the surface of the die and the pins and the package induces stray conduction paths that cause errors in the measurement. In an attempt to counter that, many sensors use a flexible silicone gel or parylene overcoat 125 as a barrier to contamination.

The silicone gel approach has several disadvantages, for example: 1) It mass-loads the top of the diaphragm causing increased sensitivity to G forces; 2) the gel is hygroscopic and slowly absorbs water over time thereby negating its potential benefit; 3) the gel deteriorates with time and environmental exposure, thereby changing its physical characteristics; and 4) the gel adds extreme thermal and pressure hysteresis to the measurement, thereby limiting its use for precision applications.

Parylene, being a gaseous-deposition ultra-thin coating performs orders of magnitude better in regard to most of the errors it induces relative to the silicone gel, however, it still suffers the following drawbacks: 1) It has limited environmental compatibility vs. time, temperature, and compatibility with the pressure media, especially oxygen and ozone; and 2) the parylene film deposited over the sensor diaphragm creates both thermal and pressure hysteresis due to the mismatch of the thermal coefficient of expansion between materials.

FIG. 2 shows a conventional differential pressure sensor 200 having a sensor die 202 coupled to a perforated glass support member 204. The perforated glass support member 204 is adhered with an adhesive 206 to a package 208. The package 208 includes a first pressure port 210 and a second pressure port 212 configured to permit a sensor diaphragm 214 to be displaced by the differential pressure acting on the diaphragm 214. Electrical connections to and from the sensor die 102 are provided via bond wires 218 coupled to electrical interconnect pins 220. The pins 220 are positioned within insulated seals 222 that extend through the header portion 224 of the package 208. In this configuration, the higher pressure must always be applied to pressure port 210 because the adhesive 206 used to attach the glass support member to the package is often insufficiently robust in tension to maintain a seal at the interface between package 224 and the glass support member 204 if the higher pressure were to be applied to port 212. In addition, a flexible silicone gel or parylene overcoat 225 operates as a barrier to contamination.

The main drawbacks for the conventional absolute and differential pressure sensors described above are the previously discussed performance, reliability and environmental robustness of the sensors due to their packaging approach. FIG. 3 schematically shows a portion of a pressure sensor 300 that alleviates at least some of the previously discussed problems since the pressure sensing die 302 is not coated with any material that would affect its performance and it also resides within a pristine vacuum environment 303.

In this embodiment, the sensor die 302 is coupled to an inner glass support tube 304. An adhesive or soldered "butt" joint 306 hermetically attaches the inner glass support tube 304 to a metallic package 308. The inner glass support tube 304 includes a passageway 310 where a pressurized media "P" loads the sensor die 302 when the sensor 300 is in operation. Loading the sensor die 302 with a positive pressure places the butt joint 306 in tension. In addition, torsional or bending loads applied to the sensor die 302 may tend to induce shear loads across the interface between the sensor die 302 and the inner glass support tube 304, for example the shear loads would be along lateral or radial axes as defined by the inner glass support tube 304. An overload of any one of these load conditions may result in a failure of the pressure sensor 300. Further, repeated loading of the sensor die 302 and resultant stressing of the solder or adhesive material may eventually degrade the structural integrity of the butt joint 306, causing a non-instantaneous degradation in sensor performance, and in some instances may lead to an instantaneous failure of the pressure sensor 300. This sensor configuration also has limited life in high vibration environments. This is due to the limited cross-sectional area of the attachment combined with the cantilevered configuration of the sensor and glass support tube assembly.

FIG. 4 schematically shows a portion of an improved pressure sensor configuration 400 having a sensor die 402 coupled to an inner glass support tube 404. A soldered "sleeve" joint 406 attaches the inner glass support tube 404 to an intermediate metallic sleeve 408 as described in U.S. Pat. No. 4,509,880 and is further located within a pristine vacuum environment 403. The inner glass support tube 404 includes a passageway 410 where a pressurized media "P" loads the sensor die 402 when the sensor 400 is in operation. Loading the sensor die 402 with a positive pressure (up the tube) places the sleeve joint 406 in shear and tension. Again and similar to the pressure sensor of FIG. 3, repeated loading of the sensor die 402 and stressing of the solder material in shear or tension may eventually degrade the structural integrity of the sleeve-type hermetic seal 406, causing a non-instantaneous degradation in sensor performance, or, in some instances, may lead to an instantaneous failure of the pressure sensor 400. This sleeve joint is stronger than the above-described butt joint in both vibration and pressure environments due to the increased support area of the joint, with resulting reliability improvements. In addition, the joint may include a metallic layer 412 to help the inner glass support tube 404 bond to the metallic sleeve 408. However, one drawback of the sleeve joint 406 is that it is still loaded in shear, which limits the amount of pressure up-the-tube to applications of 1000 psi or less.

SUMMARY OF THE INVENTION

The present invention provides a more robust attachment between the sensor's IC's mounting tube and a hermetic package, which addresses the above-mentioned problem by placing at least a portion of the attachment joint in compression to substantially reduce, if not eliminate, the potential failure modes in traditional butt and sleeve joint types of pressure sensors or transducers.

In one aspect of the invention, a pressure sensor includes a sensor die; a glass support tube having an expanded or portion and a narrow or necked-down portion. The expanded portion is distally located from the sensor die. The perimeter of the expanded portion is significantly larger than the perimeter of the necked-down portion. A glass support tube is located within the intermediate sleeve and includes an expanded perimeter portion and a reduced perimeter portion. The expanded perimeter portion is sized to be closely received by the expanded portion of the intermediate sleeve the reduced perimeter portion is sized to be closely received by the necked-down portion of the intermediate sleeve. The glass support tube further includes a bore for receiving a pressurized fluid and a contoured surface that is substantially complementary to a corresponding inner surface of the intermediate sleeve. An attachment joint, typically taking the form of a solder based material, is located between the glass support tube and the intermediate sleeve to attach the two components together. The attachment is configured such that when pressure is applied through the tube to the sensor die, at least a portion of the attachment is placed in compression.

In another aspect of the invention, a method of reacting applied pressure in a pressure sensor includes applying pressure to a pressure sensor die mounted on a first end of an inner glass tube (commonly referred to as a "chip tube"). The glass tube includes a expanded distal end portion. During operation, the applied pressure generates strain on the solder-based attachment of the inner glass tube relative to the metallic intermediate sleeve. In this embodiment, that strain is reacted through converting the strain at the attachment due to high applied pressure primarily into a compressive strain in lieu of the weaker tension and shear strain of the prior configuration shown in FIG. 4. The sensor configuration shown in FIG. 5 still utilizes the shear stress of the sleeve joint to rigidly captivate the glass tube during vibration, thus providing a substantially more robust assembly.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

In the following description, certain specific details are set forth in order to provide a thorough understanding of various embodiments of the invention. However, one skilled in the art will understand that the invention may be practiced without these details or with various combinations of these details. In other instances, well-known structures and methods associated with pressure sensors and the operation thereof may not be shown or described in detail to avoid unnecessarily obscuring descriptions of the embodiments of the invention.

The following description is generally directed to an attachment joint for a pressure sensor where at least a portion of the joint is under compression during operation. By arranging at least a portion of the joint to be under compression, the failure modes of the previously-described butt and sleeve joints may be substantially reduced, if not eliminated. In a preferred embodiment, the pressure sensor includes a bulbous or expanded end portion sized and contoured to place at least a portion of solder material or adhesive located in the joint into compression when pressure is applied to the pressure sensor.

Figure 1:
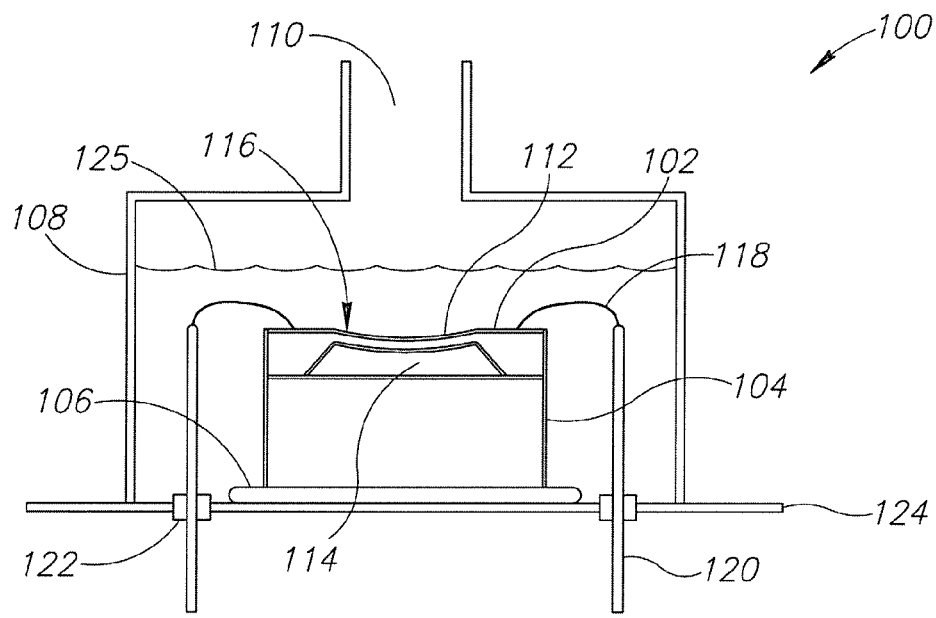
FIG. 1 is a schematic diagram of a conventional, prior art absolute pressure sensor having one pressure inlet port.
Figure 2:
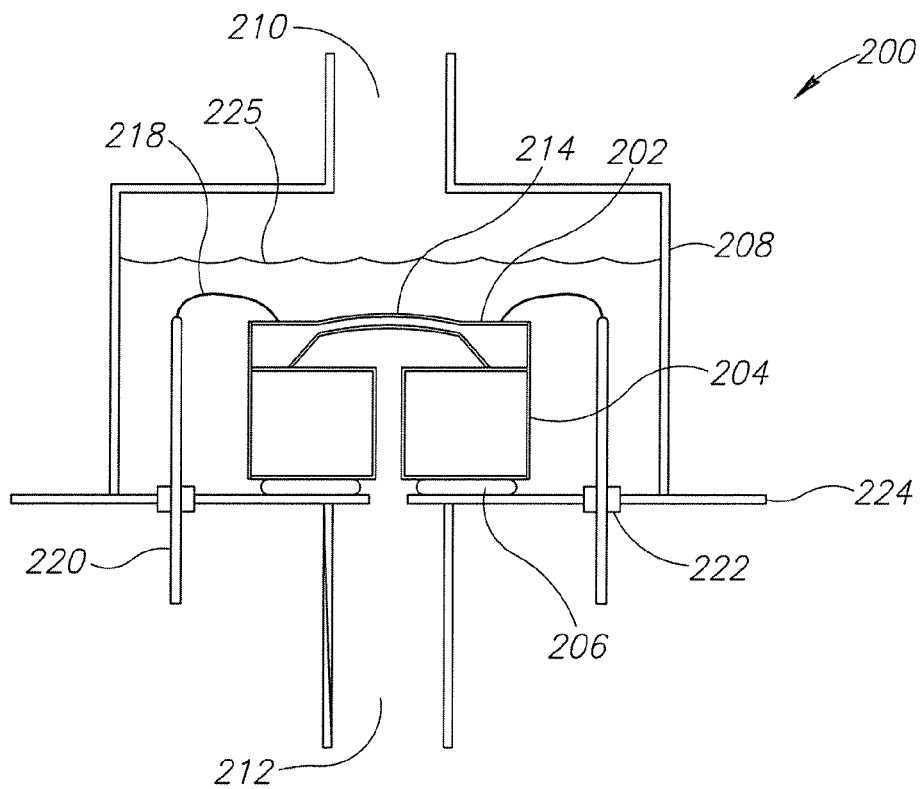
FIG. 2 is a schematic diagram of a conventional, prior art differential pressure sensor having two, opposing pressure inlet ports.
Figure 3:
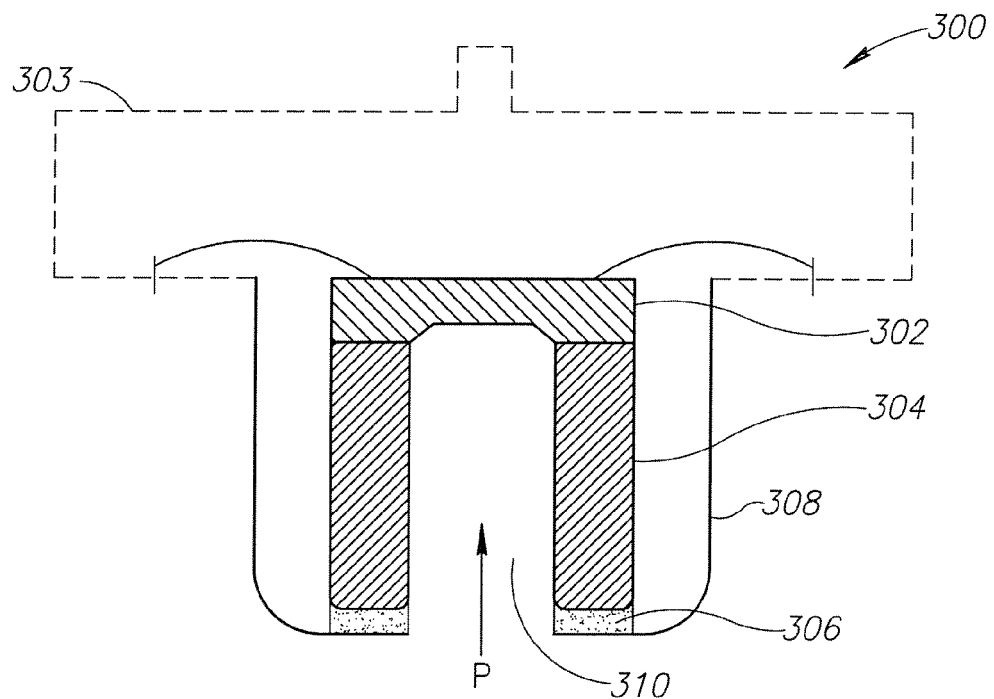
FIG. 3 is a schematic, cross-sectional view of a portion of a prior art pressure sensor having a hermetic glass-to-metal butt joint.
Figure 4:
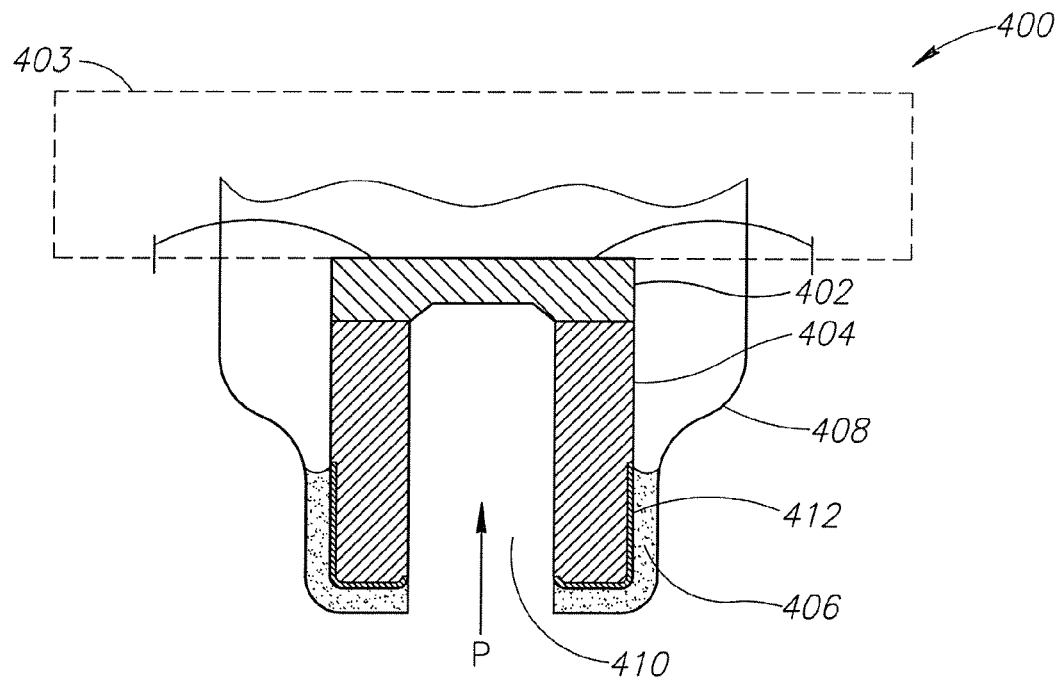
FIG. 4 is a schematic, cross-sectional view of a portion of a prior art pressure sensor having a hermetic glass-to-metal intermediate sleeve joint.
Figure 5:
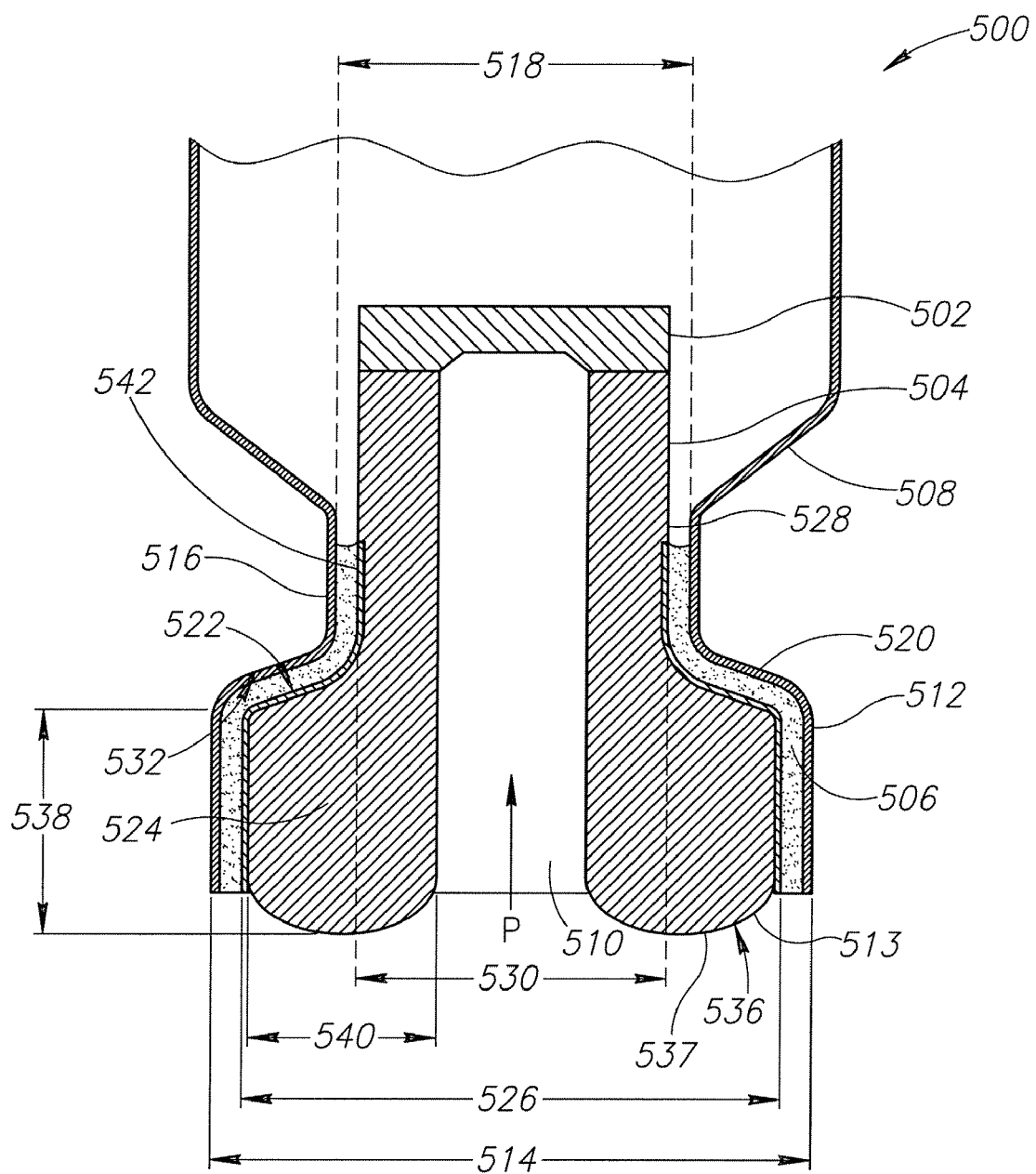
FIG. 5 is a schematic, cross-sectional view of a pressure sensor having a glass-to-metal hermetic seal that is arranged to be in compression during operation of the pressure sensor according to the embodiment of the invention.

FIG. 5 schematically shows a cross-sectional view of a portion of a pressure sensor 500 having a sensor die 502 coupled to a glass support tube 504. A solder or adhesive 506 attaches the glass support tube 504 to an intermediate sleeve 508. The function of this intermediate sleeve is described in U.S. Pat. No. 4,509,880. The glass support tube 504 includes a bore or passageway 510 through which the pressure media "P" loads the sensor die 502.

In a preferred embodiment, the intermediate sleeve 508 includes a first portion 512 with a first perimeter 514 extending into and coupled to a second portion 516 with a second perimeter 518. The first portion 512 is distally located from the sensor die 502 and the first perimeter 514 is preferably larger than the second perimeter 516. In the illustrated embodiment, the first portion 512 takes the form of an expanded or bulbous end portion and the second portion 516 takes the form of a recessed or necked-down portion. In addition, first portion 512 is coupled to the recessed portion 516 via a sloped or tapered shoulder 520. In another embodiment, the first portion 512 and the second portion 516 may be connected by a stepped surface (not shown). By way of example, the intermediate sleeve 508 may made from a KOVAR® metallic alloy.

The glass support tube 504 is located within the intermediate sleeve 508 and includes a surface 522 contoured to be closely received by the first and second portions 514, 516 of the intermediate sleeve 508. This conformal faying surface 522 of the glass tube is typically plated with metal 538 to enhance attachment with solder when the adhesive is employed.

In particular and as illustrated, the glass support tube 504 includes an expanded perimeter portion 524 having a perimeter 526 sized to be closely received by the first portion 512 of the intermediate sleeve 508. In addition, the glass support tube 504 includes a necked-down portion 528 having a perimeter 530 sized to be closely received by the second portion 516 of the intermediate sleeve 508. The expanded perimeter portion 524 is distally located from the sensor die 502. The surface 522 of the glass support tube 504 is complementarily contoured with respect to an inner surface 532 defined by the first and second portions 514, 516 of the intermediate sleeve 508. As will be described in greater detail below, the solder or other adhesive attachment layer 506 is located between the surface 522 of the glass support tube 504 and the inner surface 532 of the intermediate sleeve 508.

The glass support tube 504 and the intermediate sleeve 508 are coupled together via the attachment layer 506, which, as noted above, is located between the outer surface 522 of the glass support tube 504 and the inner surface 532 of the intermediate sleeve 508. Due to the configuration of the complementary surfaces 522 and 532, applied pressure on the sensor die 502 places at least a portion of the attachment layer 506 in compression.

In a preferred embodiment, the glass support tube 504 is a cylindrically shaped glass support tube 504 where the first portion 512 takes the form of an expanded or bulbous end portion 513. The glass support tube 504 may be made of any appropriate glass material. In the preferred embodiment, the glass support tube 504 is made from PYREX® glass material. In addition, the glass support tube 504 may have a rounded, flame polished surface 536 at the distal end 537. Preferably, the longitudinal length 538 is longer than the thickness 540 of the expanded or bulbous end portion 513.

In one embodiment, a thin metallic layer 542 may be located on the inner surface 522 of the glass support tube 504 adjacent the attachment layer 506 by plating, coating, or some other equivalent process. The metallic layer 542 assists in solder bonding of the glass support tube 504 to the intermediate sleeve 508. In one embodiment, the metallic layer 542 is a platinum-silver layer having an approximate thickness of about 0.001 inches. In other embodiment, the metallic layer 542 may include amounts of titanium, tungsten, nickel, gold, or other materials as generally described in U.S. Pat. No. 4,509,880.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A pressure sensor comprising:
a sensor die;
an intermediate packaging member or sleeve having a first portion with a first perimeter extending into and coupled to a second portion with a second perimeter, the first portion distally located from the sensor die, wherein the first perimeter is larger than the second perimeter;
a glass support tube located within the intermediate sleeve or member, the glass support tube having an expanded perimeter portion with a perimeter sized to be closely received by the first portion of the intermediate sleeve or member and further having a reduced perimeter portion with a perimeter sized to be closely received by the second portion of the intermediate sleeve or member, the expanded perimeter portion is distally located from the sensor die, the glass support tube includes a bore for receiving a pressurized fluid, wherein a contour of an outer surface defined by the expanded and reduced perimeter portions of the glass support tube complements a contour of an inner surface defined by the first and second portions of the intermediate sleeve or member; and
an attachment layer to couple the glass support tube to the intermediate sleeve or member, the attachment layer located between the outer surface defined by the expanded and reduced perimeter portions of the glass support tube and the inner surface defined by the first and second portions of the intermediate sleeve or member, wherein applied pressure on the sensor die places at least a portion of the attachment layer in compression.

2. The pressure sensor of claim 1, wherein the intermediate sleeve or member is made from a KOVAR®® metallic alloy.

3. The pressure sensor of claim 1, wherein the intermediate sleeve or member is cylindrically shaped.

4. The pressure sensor of claim 1, wherein the glass support tube is made from a PYREX® glassware material.

5. The pressure sensor of claim 1, wherein the glass support tube is cylindrically shaped.

6. The pressure sensor of claim 1, wherein the second end of the glass support tube includes a flame polished surface.

7. The pressure sensor of claim 1, further comprising a layer of metallic material located on a section of the glass support tube.

8. The pressure sensor of claim 7, wherein the layer of metallic material extends onto the expanded and reduced perimeter portions of the glass support tube.

9. The pressure sensor of claim 1, wherein the layer of metallic material includes at least an amount of gold.

10. The pressure sensor of claim 1, wherein an outer surface portion of the glass support tube is at least partially plated with a metallic material.

11. The pressure sensor of claim 1, wherein the attachment layer includes an amount of solder material to bind the glass support tube to the intermediate sleeve.

12. A pressure sensor comprising:
an inner glass tube having an inner bore defined by an inner surface, the inner glass tube further having a first outer surface region coupled to an expanded outer surface region through a shoulder region, the first outer surface region having a first circumference and the expanded outer surface region having a second circumference that is larger than the first circumference to define a bulbous end portion extending from the shoulder region;
an outer metallic cylinder having an inner surface complementarily shaped to closely receive the first outer surface region and the expanded outer surface region of the inner glass tube; and
an amount of solder or other adhesive material positioned, in part, on the shoulder region of the inner glass tube and in contact with the outer metallic cylinder, wherein stress on the inner glass tube with respect to the outer metallic cylinder in a first direction places that amount of solder or other adhesive material between them in a compressive state.

13. The pressure sensor of claim 12, wherein the outer metallic cylinder is made from a KOVAR® metallic alloy.

14. The pressure sensor of claim 12, wherein the inner glass tube is made from a PYREX® glassware material.

15. The pressure sensor of claim 12, wherein an end of the expanded outer surface region of the inner glass tube includes a flame polished surface.

16. The pressure sensor of claim 12, wherein the amount of solder material includes solder material positioned, in part, on a shoulder of the glass tube.

17. A method of reacting to applied pressure in a pressure sensor, the method comprising:
applying pressure to a pressure sensor die mounted on a first end of an inner glass tube having a bulbous end portion;
generating a stress between the inner glass tube relative to a metallic intermediate sleeve having a necked-down portion coupled to a bulbous end portion having a contour complementary to the bulbous end portion of the inner glass tube; and
placing a bonding material in a compressive state when pressure is applied to the sensor die, such bonding material being located between the inner glass tube and the metallic intermediate sleeve.

18. The method of claim 17, wherein placing the bonding material in a compressive state includes placing an amount of solder material in a compressive state.

19. The method of claim 17, wherein applying pressure to the pressure sensor die includes applying a differential pressure across a diaphragm of the sensor die.

20. The method of claim 17, wherein applying pressure to the pressure sensor die includes applying an absolute pressure on a diaphragm of the sensor die.

* * * * *